United States Patent
Korlepara

(10) Patent No.: US 7,519,858 B2
(45) Date of Patent: Apr. 14, 2009

(54) SELECTIVE FILE RESTORATION FROM INCREMENTAL BACKUPS

(75) Inventor: Pavan Kumar Korlepara, Hyderabad (IN)

(73) Assignee: Computer Associates Think, Inc., Islandia, NY (US)

( * ) Notice: Subject to any disclaimer, the term of this patent is extended or adjusted under 35 U.S.C. 154(b) by 358 days.

(21) Appl. No.: 11/465,492

(22) Filed: Aug. 18, 2006

(65) Prior Publication Data

US 2008/0126722 A1    May 29, 2008

(51) Int. Cl.
   *G06F 11/00*    (2006.01)
(52) U.S. Cl. .............................. 714/15; 714/38; 711/162
(58) Field of Classification Search ........................ None
   See application file for complete search history.

(56) References Cited

U.S. PATENT DOCUMENTS

| | | | |
|---|---|---|---|
| 6,574,709 B1 | 6/2003 | Skazinski et al. | 711/119 |
| 6,691,245 B1 * | 2/2004 | DeKoning | 714/6 |
| 6,981,177 B2 * | 12/2005 | Beattie | 714/20 |
| 7,251,749 B1 * | 7/2007 | Fong et al. | 714/20 |
| 7,370,164 B1 * | 5/2008 | Nagarkar et al. | 711/162 |
| 2004/0030852 A1 * | 2/2004 | Coombs et al. | 711/162 |
| 2004/0163009 A1 * | 8/2004 | Goldstein et al. | 714/6 |
| 2006/0053121 A1 * | 3/2006 | Zizys et al. | 707/100 |

OTHER PUBLICATIONS

"Veritas Storage Replicator for Volume Manager™ 3.1", Release Notes, Solaris, Copyright © 2000 Veritas Software Corporation, www.veritas.com, 18 pages, Aug. 11, 2000.
BrightStor Solutions for Microsoft Exchange, "*Data Availability and Storage Management for Microsoft Exchange*", Computer Associates International, Inc., www.ca.com/brightstor, 7 pages, Printed Apr. 2006.
Pending U.S. Appl. No. 11/426,640 entitled "*Maintaining A Change Map Of A Block Level Storage Device*", 29 pages specification, claims and abstract, 2 pages of drawings, inventor Pavan Kumar Korlepara, Filed Jun. 27, 2006.

* cited by examiner

*Primary Examiner*—Christopher S McCarthy
(74) *Attorney, Agent, or Firm*—Baker Botts L.L.P.

(57) ABSTRACT

According to one embodiment, providing application information includes receiving a request for application information associated with a checkpoint. A checkpoint corresponds to an incremental backup of a sequence of incremental backups of the application information. The following is performed for each logical block of one or more logical blocks that store the application information: establish whether any incremental backup records a change for a logical block; process the request using an incremental backup if the incremental backup records a change for the logical block; and process the request using a full backup of the application information if no incremental backup records a change for the logical block.

17 Claims, 2 Drawing Sheets

SELECTIVE FILE RESTORATION FROM INCREMENTAL BACKUPS

TECHNICAL FIELD

This invention relates generally to the field of storage systems and more specifically to providing application information from incremental backups.

BACKGROUND

System administrators typically perform procedures, for example, backups and data replication, in order to maintain a storage system. Although the capacity and complexity of storage systems are growing, the opportunity to perform such administrative procedures is decreasing. Accordingly, system administrators face difficulties completing overall administrative procedures without affecting the performance of the system. As a result, system administrators sometimes perform incremental backups.

Known techniques for performing incremental backups utilize application specific techniques. Application specific techniques, however are not flexible. Accordingly, these known techniques are not effective and efficient in certain situations. It is generally desirable to be effective and efficient in certain situations.

SUMMARY OF THE DISCLOSURE

In accordance with the present invention, disadvantages and problems associated with previous techniques for providing application information may be reduced or eliminated.

According to one embodiment of the present invention, providing application information includes receiving a request for application information associated with a checkpoint. A checkpoint corresponds to an incremental backup of a sequence of incremental backups of the application information. The following is performed for each logical block of one or more logical blocks that store the application information: establish whether any incremental backup records a change for a logical block; process the request using an incremental backup if the incremental backup records a change for the logical block; and process the request using a full backup of the application information if no incremental backup records a change for the logical block.

Certain embodiments of the invention may provide one or more technical advantages. A technical advantage of one embodiment may be that a buffer cache layer of an operating system may be configured such that a file system reads directly from an underlying block storage during a restoration phase. A technical advantage of another embodiment may be that a user may readily access application information associated with a particular checkpoint without restarting the application or restoring incremental backups. A technical advantage of another embodiment may be that a method may be used to identify an incremental backup that records the changes to a particular block. A technical advantage of yet another embodiment may be that a selective file restorer switch may be used to designate the checkpoint requested by the user.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
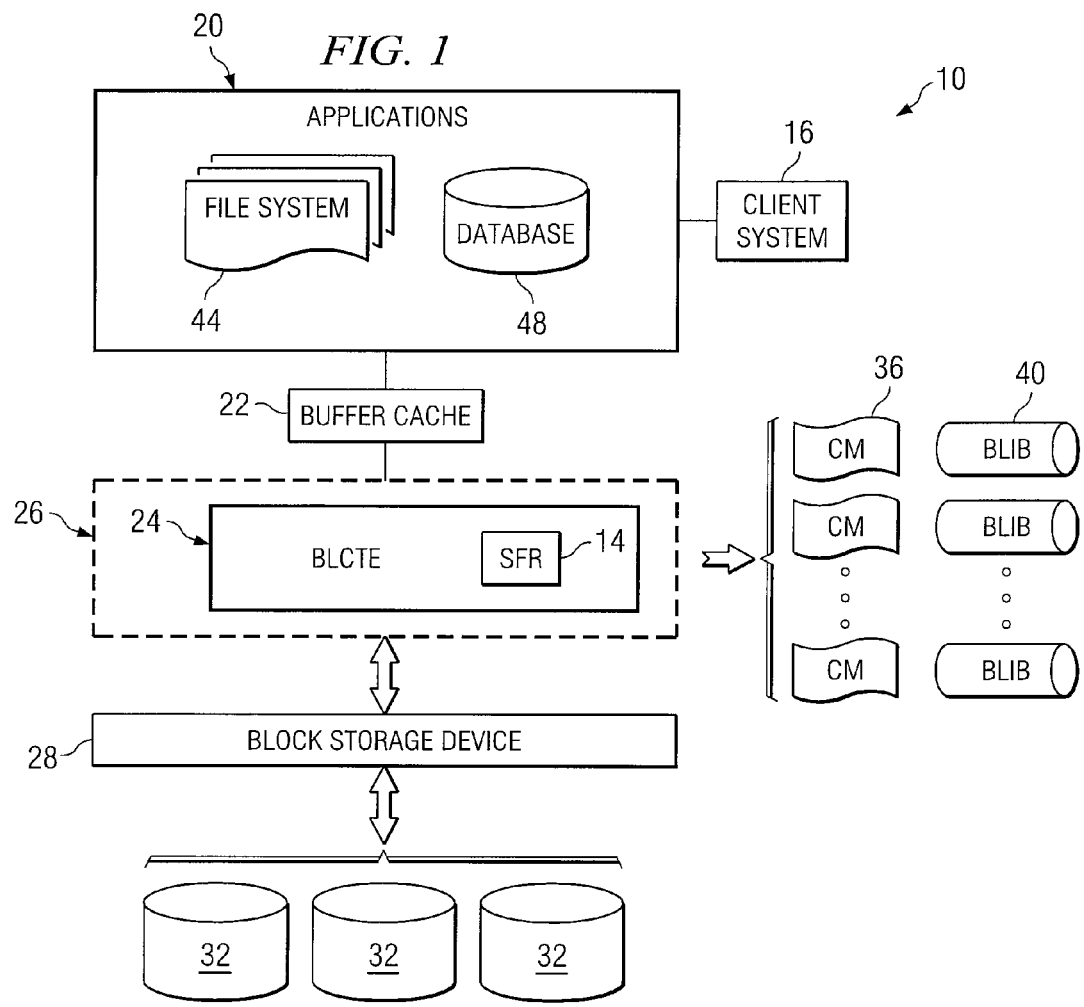
FIG. 1 is a block diagram illustrating one embodiment of a system that utilizes block level incremental backups (BLIBs)
Figure 2A:
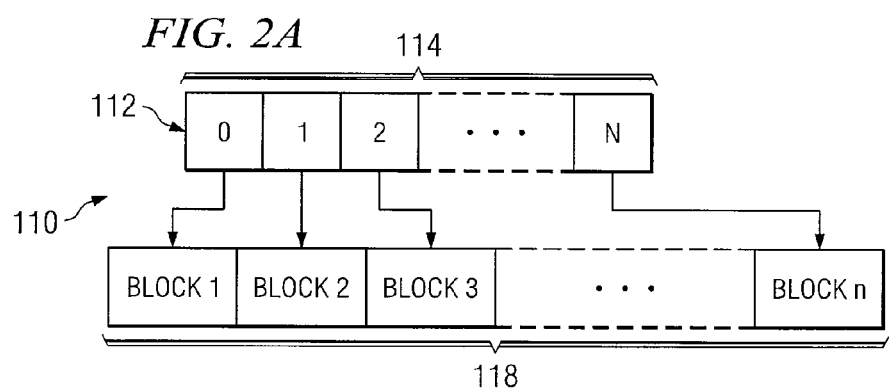
FIG. 2A is a diagram illustrating an example full change map according to one embodiment.
Figure 2B:
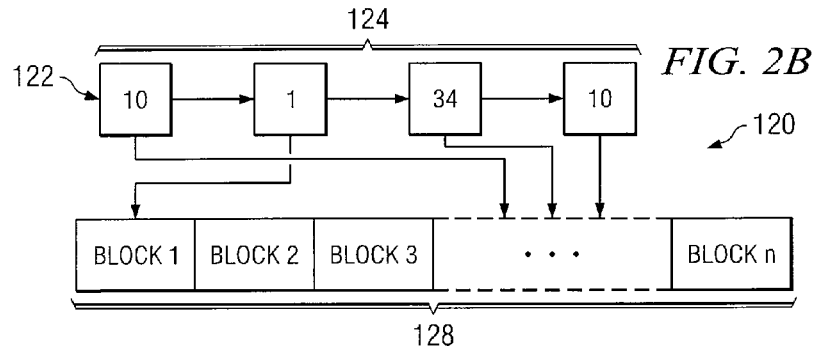
FIG. 2B is a diagram illustrating an example partial change map according to one embodiment.
Figure 3:
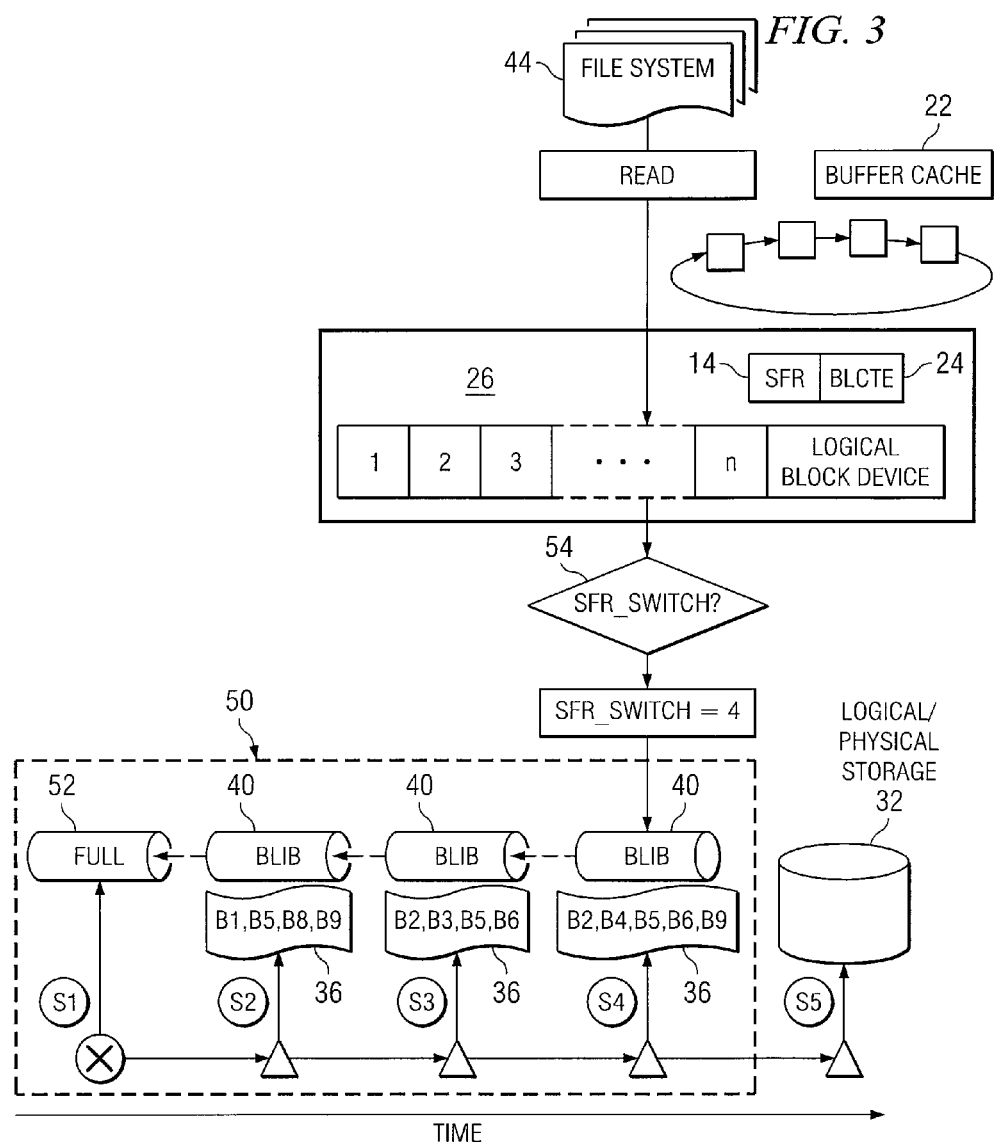
FIG. 3 is a diagram illustrating one embodiment of a method for providing application information.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 that utilizes block level incremental backups (BLIBs) 40. Block level incremental backups 40 typically backup only the blocks that have changed between checkpoints, such as points in time. System 10 includes a selective file restorer 14 that provides for block level incremental backups 40 that support restoration at selected checkpoints. The buffer cache layer of an operating system may be configured such that a file system reads directly from an underlying block storage during restoration.

System 10 represents any suitable system that utilizes block level incremental backups 40. System 10 includes components. In general, a component may include any suitable arrangement of elements operable to perform the operations of the component. As an example, a component may include logic, an interface, memory, other element, or any suitable combination of the preceding.

"Logic" may refer to hardware, software, other logic, or any suitable combination of the preceding that may be used to perform operations according to instructions. Certain logic may manage the operation of a component, and may comprise, for example, a processor. "Processor" may refer to any suitable component operable to execute instructions and manipulate data to perform operations.

"Interface" may refer to logic of a component operable to receive input for the component, send output from the component, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes a client system 16, one or more applications 20, a buffer cache 22, a block level change tracking engine-selective file restorer (BLCTE-SFR) module 26, one or more block storage devices 28, one or more storage units 32, one or more change maps (CMs) 36, and one or more block level incremental backups (BLIBs) 40 coupled as shown.

Client system 16 may represent a computer system that allows a user to interact with other components of system 10. According to one embodiment, a user may select to access application information associated with a particular checkpoint. The user may access the information without restarting the application or restoring incremental backups. Client system 16 may have an interface that allows the user to select the particular checkpoint.

Applications 20 may represent software or other logic applications. An application 20 may store information in storage units 28 through block storage device 28. Information may refer to data, text, voice, audio, video, multimedia, control, signaling, other information, or any combination of the preceding. Applications 20 may include a file system 44 and a database 48. File system 44 represents a collection of files and file management structures. Database 48 represents memory operable to store information for file system 44.

An application 20 may send requests to instruct block storage device 28 to perform an operation on storage units 28. A request may specify the type of operation, such as a read or write operation, and the location where the operation is to be performed. The location may be designated by a block, which may be identified by a target device and an offset value.

Buffer cache 22 represents a collection of buffers that may be used as temporary memory storage. Buffer cache 22 may improve access to blocks that have already been accessed. An accessed block may refer to a block on which an operation has been performed. Buffer cache 22 may be invalidated to allow requests to pass through to BLCTE-SFR module 26. Buffer cache 22 may be invalidated per block storage device 28, so buffer cache 22 need not affect other block storage devices 28 or applications 20.

According to one embodiment, the first time a read request for a block is received by block storage device 28, information from the block may be copied into buffer cache 22. If another read request is received for the same block, the information may be read from buffer cache 22. Accordingly, there is no need to send the request to block storage device 28. The first time a write request for a block is received by buffer cache 22, the information from the request is copied into buffer cache 22. The request is then sent to block storage device 28. The next time a read request for the block is received, the information may be read directly from buffer cache 22.

BLCTE-SFR module 26 includes a block level change tracking engine (BLCTE) 24 and a selective file restorer 14. According to one embodiment, BLCTE 24 services write requests, and selective file restorer 14 services read requests. Selective file restorer 14 may be together with or separate from block level change tracking engine 24. According to one embodiment, selective file restorer 14 may be built into a kernel module with block level change tracking engine 24.

According to the embodiment, BLCTE 24 represents a tracking engine that establishes and records changes of block storage device 28. BLCTE 24 may intercept requests from applications 20 to establish the changes. Other requests may be passed through by BLCTE 24. BLCTE 24 may also determine and maintain the geometry of block storage devices 28 that it manages. BLCTE 24 may perform standard geometry input/output controls (IOCTLs) to determine the geometry.

Selective file restorer 14 represents a file restorer operable to selectively restore particular blocks of block storage device 28. Selective file restorer 14 may perform the selective file restoration without the need to restart an application 20 or to restore previous versions of the information. An example selective file restorer is described in more detail with reference to FIG. 3.

A block level incremental backup (BLIB) 40 represents a copy of blocks that have changed between checkpoints. A block level incremental backup 40 may be generated by copying logical blocks from block storage device 28 at the checkpoints. An incremental backup 40 may be stored on any suitable memory, for example, on disks.

A checkpoint may correspond to a particular version of application information, and may be designated in any suitable manner. As an example, checkpoints may be designated by specific times given by, for example, a date and time. As another example, checkpoints may be designated using an interval between checkpoints. The intervals may be given using any suitable time unit, for example, minutes, hours, or days. A checkpoint may be provided by software code or by user input.

Block storage device 28 represents logical blocks of data stored in storage units 32. A logical block may refer to logically linked, but not necessarily contiguous areas of storage. A logical block may comprise a unit of a data set that is transferred between a main storage and an auxiliary storage during an input/output operation. Block storage device 28 and storage units 32 may comprise any suitable memory. According to one embodiment, block storage device 28 and storage units 32 may comprise a physical disk, a virtual disk, or a logical volume organized using a logical volume manager.

A change map 36 represents a data structure that records the changes of block storage device 28. According to one embodiment, a change map 36 associated with a block level incremental backup 40 may list the blocks for which backup 40 has copies.

A change map 36 may comprise an array of bits. A bit represents a logical block of block storage device 28 and records whether there are changes in the logical block. A change map 36 may have any suitable format. As an example, a change map 36 may be a full change map or a partial change map. Examples of full and partial change maps are described in more detail with reference to FIGS. 2A and 2B, respectively.

A change map 36 may have any suitable persistence, for example, a change map 36 may be persistent or non-persistent. Change maps 36 may be generated for any suitable unit. For example, a change map 36 may be generated for each block storage device or for each application 20.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of BLCTE 24 and selective file restorer 14 may be performed by one module, or the operations of file selective restorer 14 may be performed by more than one module. Additionally, operations of system 10 may be performed using any suitable logic. As used in this document, "each" refers to each member of a set or each member of a subset of a set.

FIG. 2A is a diagram 110 illustrating an example full change map 112 according to one embodiment. Diagram 110 illustrates full change map 112 and a corresponding sequence of n logical blocks 118. Full change map 112 comprises an array of N bits 114, where N=n. According to the illustrated embodiment, each bit 114 corresponds to a logical block 118.

BLCTE 24 maintains full change map 112 by establishing a change for a logical block 118, and recording the change in a bit 114 corresponding to the changed logical block 118.

According to one embodiment, BLCTE 24 intercepts a change information call, such as a read request, that indicates a change and a logical block 118 to which the change applies. BLCTE 24 then records the change in a bit 114 corresponding to the logical block 118.

Full change map 112 may be used if the granularity, logical block size, and kernel memory are of the appropriate size to store the change map. As an example, if the block size is 100 megabytes and the granularity is 1 megabyte, then the change map is a bit map of 100 bits, where each bit represents a continuous 1 megabyte region.

Modifications, additions, or omissions may be made to change map 112 without departing from the scope of the invention. Change map 112 may include more, fewer, or other fields or values. Additionally, the fields or values may be configured in any suitable arrangement without departing from the scope of the invention.

FIG. 2B is a diagram 120 illustrating an example partial change map 122 according to one embodiment. Diagram 120 illustrates partial change map 122 and a corresponding sequence of logical blocks 128. Partial change map 122 comprises a linked list of nodes 124, which may be implemented as a C/C++ data structure. According to the illustrated embodiment, each node 124 corresponds a changed logical block 128.

BLCTE 24 maintains partial change map 122 by adding a node 124 to the linked list as and when a change occurs. Partial change map 122 may be used to record the sequence of write calls. There may be multiple write calls to the same block 128, so multiple nodes 24 may correspond to the same logical block 128. According to the illustrated example, nodes 10, 34, and 10 correspond to the same logical block 128. According to one embodiment, duplicates may be reduced or eliminated. As an example, the last node of a list corresponding to the same logical block may be maintained, while the other duplicate nodes are removed.

Modifications, additions, or omissions may be made to change map 122 without departing from the scope of the invention. Change map 122 may include more, fewer, or other fields or values. Additionally, the fields or values may be configured in any suitable arrangement without departing from the scope of the invention.

FIG. 3 is a diagram illustrating one embodiment of a method for providing application information. The diagram includes file system 44, buffer cache 22, BLCTE-SFR module 26 with BLCTE 24 and selective file restorer 14, selective file restorer (SFR) switch 54, and a sequence 50 of backups 40 and 52 and change maps 36 associated with backups 40. File system 44, buffer cache 22, BLCTE-SFR module 26, BLCTE 24, selective file restorer 14, change maps 36, and backups 40 may be as described with reference to FIG. 1.

Sequence 50 may include N backups comprising a full backup 52 and one or more incremental backups 40. An incremental backup 40 is performed at a checkpoint, and the checkpoints are assigned sequence numbers that indicate the order of the checkpoints. According to the illustrated example, sequence 50 includes N=4 backups, a full backup 52 and three incremental backups 40. The checkpoints are assigned sequence numbers S1, S2, S3, and S4.

An incremental backup 40 may record changes for only certain blocks of block storage device 28. A change map 36 corresponding to an incremental backup 40 lists the blocks for which backup 40 has recorded changes. According to the illustrated example, change map 36 of backup 40 for sequence number S2 indicates that backup 40 records changes for blocks B1, B5, B8, and B9; change map 36 of backup 40 for sequence number S3 indicates that backup 40 records changes for blocks B2, B3, B5, and B6; and change map 36 of backup 40 for sequence number S4 indicates that backup 40 records changes for blocks B2, B4, B5, B6, and B9.

Selective file restorer 14 processes a request for information from a block by checking a change map 36 to establish whether a backup has recorded a change for the block. If the change map 36 does not include the block, selective file restorer 14 determines whether a preceding change map 36 includes the block. If none of the change maps 36 include the block, selective file restorer 14 routes the read request to full backup 52.

SFR switch 54 represents a switch that is set to the sequence number corresponding to the checkpoint associated with a request, which enables selective file restorer 14 to determine the source of a read operation. SFR switch 54 may be implemented as a counter.

SFR switch 54 may have a setting for each checkpoint and a default setting. The default setting indicates that requests are to be sent to block storage device 28. According to the illustrated example, SFR switch 54 has N+1=5 settings, one setting for each of the sequence numbers S1, S2, S3, and S4 and one default setting. If SFR switch 54 is set to a value less than N+1, the read request may be serviced by a backup 40 in decreasing order of the sequence numbers or by the full backup.

According to one embodiment of operation, SFR switch 54 is set to the default setting at initialization, so the requests are sent to block storage device 28. In one example, a read request is received for the checkpoint with sequence number S4 requesting access to blocks B2, B3, B1, and B7. SFR switch 54 is set to the setting for S4, and buffer cache 22 is invalidated.

In the example, selective file restorer 14 establishes that change map 36 corresponding to sequence number S4 includes block B2, so selective file restorer 14 processes the read request. Change map 36 corresponding to sequence number S4 does not include a change record for block B3, so selective file restorer 14 refers to the preceding change map 36. Change map 36 corresponding to sequence number S3 includes block B3, so selective file restorer 14 processes the read request.

Selective file restorer 14 establishes that change map 36 corresponding to sequence number S2 includes block B1, so selective file restorer 14 processes the read request. Selective file restorer 14 establishes that none of the change maps 36 include a change record for block B7, which indicates that block 7 never changed. Selective file restorer 14 routes the read request to the full backup corresponding to sequence number S1. SFR switch may be reset to N+1=5 to enable access to the data housed in block storage device 28.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a user may readily access application information associated with a particular checkpoint without restarting the application or restoring incremental backups. A technical advantage of another embodiment may be that a method may be used to identify an incremental backup that records the changes to a particular block. A technical advantage of yet another embodiment may be that a selective file restorer switch may be used to designate the checkpoint requested by the user.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for providing application information, comprising:
   invalidating a buffer cache in order to receive a request for application information corresponding to a checkpoint of a plurality of checkpoints, the application information stored by one or more logical blocks of a block storage device, each checkpoint of the plurality of checkpoints corresponding to an incremental backup of a sequence of incremental backups of the application information;
   receiving the request for application information; and
   performing the following for each logical block of the one or more logical blocks:
      establishing whether any incremental backup of the sequence of incremental backups records a change for the each logical block;
      processing the request using the any incremental backup if the any incremental backup records a change for the each logical block; and
      processing the request using a full backup of the application information if no incremental backup records a change for the each logical block.

2. The method of claim 1, wherein the establishing whether any incremental backup of the sequence of incremental backups records a change for the each logical block further comprises:
   repeating the following for each incremental backup of the sequence of incremental backups until it is established that an incremental backup records a change for the each logical block or that no incremental backup records a change for the each logical block:
      determining whether a current incremental backup records a change for the each logical block; and
      determining whether a preceding incremental backup records a change for the each logical block if the current incremental backup fails to record a change for the each logical block.

3. The method of claim 2, wherein the repeating the following for each incremental backup of the sequence of incremental backups further comprises:
   initiating the repeating with an incremental backup associated with the checkpoint of the request.

4. The method of claim 1, wherein the establishing whether any incremental backup of the sequence of incremental backups records a change for the each logical block further comprises:
   determining whether a current incremental backup records a change for the each logical block using a change map corresponding to the current incremental backup.

5. The method of claim 1, wherein the establishing whether any incremental backup of the sequence of incremental backups records a change for the each logical block further comprises:
   setting a switch to a setting corresponding to the checkpoint; and
   establishing whether an incremental backup associated with the checkpoint records a change for the each logical block.

6. One or more computer-readable media storing logic for providing application information, the logic operable to:
   invalidate a buffer cache in order to receive a request for application information corresponding to a checkpoint of a plurality of checkpoints, the application information stored by one or more logical blocks of a block storage device, each checkpoint of the plurality of checkpoints corresponding to an incremental backup of a sequence of incremental backups of the application information;
   receive the request for application information; and
   perform the following for each logical block of the one or more logical blocks:
      establish whether any incremental backup of the sequence of incremental backups records a change for the each logical block;
      process the request using the any incremental backup if the any incremental backup records a change for the each logical block; and
      process the request using a full backup of the application information if no incremental backup records a change for the each logical block.

7. The computer-readable media of claim 6, further operable to establish whether any incremental backup of the sequence of incremental backups records a change for the each logical block by:
   repeating the following for each incremental backup of the sequence of incremental backups until it is established that an incremental backup records a change for the each logical block or that no incremental backup records a change for the each logical block:
      determining whether a current incremental backup records a change for the each logical block; and
      determining whether a preceding incremental backup records a change for the each logical block if the current incremental backup fails to record a change for the each logical block.

8. The computer-readable media of claim 7, further operable to repeat the following for each incremental backup of the sequence of incremental backups by:
   initiating the repeating with an incremental backup associated with the checkpoint of the request.

9. The computer-readable media of claim 6, further operable to establish whether any incremental backup of the sequence of incremental backups records a change for the each logical block by:
   determining whether a current incremental backup records a change for the each logical block using a change map corresponding to the current incremental backup.

10. The computer-readable media of claim 6, further operable to establish whether any incremental backup of the sequence of incremental backups records a change for the each logical block by:
    setting a switch to a setting corresponding to the checkpoint; and
    establishing whether an incremental backup associated with the checkpoint records a change for the each logical block.

11. A system for providing application information, comprising:
    an interface operable to:
       receive a request for application information corresponding to a checkpoint of a plurality of checkpoints, the application information stored by one or more logical blocks of a block storage device, each checkpoint of the plurality of checkpoints corresponding to an incremental backup of a sequence of incremental backups of the application information; and a processor coupled to the interface and operable to:
invalidate a buffer cache in order to receive the request; and
perform the following for each logical block of the one or more logical blocks:
establish whether any incremental backup of the sequence of incremental backups records a change for the each logical block;
process the request using the any incremental backup if the any incremental backup records a change for the each logical block; and
process the request using a full backup of the application information if no incremental backup records a change for the each logical block.

12. The system of claim 11, the processor further operable to establish whether any incremental backup of the sequence of incremental backups records a change for the each logical block by:
repeating the following for each incremental backup of the sequence of incremental backups until it is established that an incremental backup records a change for the each logical block or that no incremental backup records a change for the each logical block:
determining whether a current incremental backup records a change for the each logical block; and
determining whether a preceding incremental backup records a change for the each logical block if the current incremental backup fails to record a change for the each logical block.

13. The system of claim 12, the processor further operable to repeat the following for each incremental backup of the sequence of incremental backups by:
initiating the repeating with an incremental backup associated with the checkpoint of the request.

14. The system of claim 11, the processor further operable to establish whether any incremental backup of the sequence of incremental backups records a change for the each logical block by:
determining whether a current incremental backup records a change for the each logical block using a change map corresponding to the current incremental backup.

15. The system of claim 11, the processor further operable to establish whether any incremental backup of the sequence of incremental backups records a change for the each logical block by:
setting a switch to a setting corresponding to the checkpoint; and
establishing whether an incremental backup associated with the checkpoint records a change for the each logical block.

16. The system of claim 11, the processor further operable to:
invalidate a buffer cache in order to receive the request;
set a switch to a setting corresponding to the checkpoint; and
establish whether any incremental backup of the sequence of incremental backups records a change for the each logical block by:
repeating the following for each incremental backup of the sequence of incremental backups until it is established that an incremental backup records a change for the each logical block or that no incremental backup records a change for the each logical block, the repeating initiated with an incremental backup associated with the checkpoint of the request:
determining whether a current incremental backup records a change for the each logical block using a change map corresponding to the current incremental backup; and
determining whether a preceding incremental backup records a change for the each logical block if the current incremental backup fails to record a change for the each logical block.

17. A system for providing application information, comprising:
means for invalidating a buffer cache in order to receive a request for application information corresponding to a checkpoint of a plurality of checkpoints, the application information stored by one or more logical blocks of a block storage device, each checkpoint of the plurality of checkpoints corresponding to an incremental backup of a sequence of incremental backups of the application information;
means for receiving the request for application information; and
means for performing the following for each logical block of the one or more logical blocks:
establishing whether any incremental backup of the sequence of incremental backups records a change for the each logical block;
processing the request using the any incremental backup if the any incremental backup records a change for the each logical block; and
processing the request using a full backup of the application information if no incremental backup records a change for the each logical block.

* * * * *